United States Patent
Eckhoff et al.

(10) Patent No.: US 11,619,173 B2
(45) Date of Patent: Apr. 4, 2023

(54) AIR START UNIT FOR STARTING AND SERVICING JET ENGINES IN AIRCRAFT

(71) Applicant: Rheinmetall Landsysteme GmbH, Unterluess (DE)

(72) Inventors: Detlef Eckhoff, Selent (DE); Guido Liebchen, Kropp (DE)

(73) Assignee: Rheinmetall Landsysteme GmbH, Unterluess (DE)

( * ) Notice: Subject to any disclaimer, the term of this patent is extended or adjusted under 35 U.S.C. 154(b) by 630 days.

(21) Appl. No.: 16/375,289

(22) Filed: Apr. 4, 2019

(65) Prior Publication Data

US 2019/0234312 A1 Aug. 1, 2019

Related U.S. Application Data

(63) Continuation of application No. PCT/EP2017/074501, filed on Sep. 27, 2017.

(30) Foreign Application Priority Data

Oct. 4, 2016 (DE) ...................... 10 2016 118 743.7

(51) Int. Cl.
*F02C 7/27* (2006.01)
*B64F 1/34* (2006.01)
(Continued)

(52) U.S. Cl.
CPC .................. *F02C 7/27* (2013.01); *B64F 1/34* (2013.01); *F02C 7/32* (2013.01); *B64D 27/16* (2013.01); *F05D 2260/85* (2013.01)

(58) Field of Classification Search
CPC .......... F04D 17/10; F04D 17/12; F04D 25/06; F04D 25/0673; F04D 35/04;
(Continued)

(56) References Cited

U.S. PATENT DOCUMENTS 3,497,133 A 2/1970 Childress et al.
3,514,219 A 5/1970 Mitchell et al.
(Continued)

FOREIGN PATENT DOCUMENTS

CN 202309194 U 7/2012
CN 105099215 A 11/2015
(Continued)

OTHER PUBLICATIONS

International Search Report dated Feb. 12, 2018 in corresponding application PCT/EP2017/074501.
(Continued)

*Primary Examiner* — Todd E Manahan
*Assistant Examiner* — Sean V Meiller
(74) *Attorney, Agent, or Firm* — Muncy, Geissler, Olds & Lowe, P.C.

(57) ABSTRACT

An air start unit for starting and servicing jet engines in aircraft and other flying machines, wherein at least one compressor is provided for generating air and a power supply for supplying electrical power consumers. The air start unit drives the compressor with at least one electric motor, with the electric motor drawing the electrical energy for operation from a high-voltage battery. The electric motors then in turn drive the compressor, which generates compressed air from ambient air for the purpose of starting and servicing the jet engines in aircraft and other flying machines. With an appropriate battery capacity, the air start unit can also supply power consumer of these aircraft and other flying machines via the power supply.

13 Claims, 2 Drawing Sheets

(51) Int. Cl.
*F02C 7/32* (2006.01)
*B64D 27/16* (2006.01)

(58) Field of Classification Search
CPC ............ F04D 29/5806; F04D 29/5813; F04D 29/5893; F04D 29/06; F04B 53/0002; B64F 1/34; B64D 27/16
See application file for complete search history.

(56) References Cited

U.S. PATENT DOCUMENTS

| | | | |
|---|---|---|---|
| 3,591,962 A | | 7/1971 | Connell |
| 4,101,100 A | * | 7/1978 | Smith .................... A62C 33/06 104/275 |
| 5,993,163 A | | 11/1999 | Iden |
| 6,424,891 B1 | | 7/2002 | Sargent et al. |
| 6,894,625 B1 | | 5/2005 | Kozma et al. |
| 7,119,450 B2 | | 10/2006 | Albrecht |
| 7,461,516 B2 | * | 12/2008 | Leadingham ........... B64F 1/364 62/236 |
| 8,055,388 B2 | * | 11/2011 | Mann, III .................. B64F 1/34 700/276 |
| 8,167,584 B2 | * | 5/2012 | Pyke ...................... F04D 29/701 417/366 |
| 8,218,341 B2 | | 7/2012 | Wiegman et al. |
| 8,703,311 B2 | * | 4/2014 | Sawaguchi ......... H01M 10/613 429/62 |
| 9,071,078 B2 | * | 6/2015 | Rockenfeller .......... F25B 27/00 |
| 9,109,589 B2 | | 8/2015 | Ichise et al. |
| 9,677,551 B2 | * | 6/2017 | Mistry .................... F04B 23/02 |
| 9,771,169 B2 | | 9/2017 | Dahl et al. |
| 9,947,976 B2 | | 4/2018 | Bui Van et al. |
| 10,450,962 B2 | | 10/2019 | Poumarede et al. |
| 10,543,934 B2 | | 1/2020 | Moes et al. |
| 2002/0182063 A1 | * | 12/2002 | Edsinger ................. F04D 17/10 415/124.1 |
| 2004/0011918 A1 | | 1/2004 | Musial et al. |
| 2005/0052165 A1 | | 3/2005 | Willner et al. |
| 2006/0168968 A1 | | 8/2006 | Zielinski et al. |
| 2009/0112368 A1 | | 4/2009 | Mann, III et al. |
| 2014/0150446 A1 | | 6/2014 | Eisenhauer et al. |
| 2015/0292511 A1 | * | 10/2015 | Sakai ...................... F04D 25/06 417/423.1 |
| 2016/0185461 A1 | | 6/2016 | Beuning et al. |
| 2016/0325850 A1 | | 11/2016 | Moes et al. |
| 2017/0297743 A1 | | 10/2017 | Tindall |

FOREIGN PATENT DOCUMENTS

| | | |
|---|---|---|
| DE | 2013482 A1 | 6/1971 |
| DE | 3409378 A1 | 3/1985 |
| DE | 202008015623 U1 | 2/2009 |
| DE | 202009014270 U1 | 2/2010 |
| DE | 20 2009 014 270 U1 | 3/2010 |
| EP | 0350615 A2 | 1/1990 |
| EP | 0473530 A1 | 3/1992 |
| EP | 1655222 A1 | 5/2006 |
| EP | 2408669 B1 | 1/2012 |
| EP | 2541063 B1 | 1/2013 |
| EP | 3006346 B1 | 4/2016 |
| EP | 3011630 A1 | 4/2016 |
| EP | 3079986 B1 | 10/2016 |
| FR | 3015571 B1 | 6/2015 |
| WO | WO8504149 A1 | 9/1985 |
| WO | WO9815456 A1 | 4/1998 |
| WO | WO2015088338 A1 | 6/2015 |

OTHER PUBLICATIONS

Zoccoli, et al: "Development of the next generation gas turbine based jet air start unit for the US Navy"; International Gas Turbine & Aeroengine Congress & Exhibition Stockholm, Sweden, Jun. 2-5, 1998.

Langlois, et al; "De l'avion plus électrique à l'avion tout électrique : état de l'art et prospective sur les réseaux de bord"; J 3eA vol. 4, 2005, Avion e t électricité, de l'electrotechnique haute performance.

Memorandum of Opposition dated May 11, 2021 in opposition of EP3523199—partial translation identifies relevant portion of cited document Langlois, et al; "De l'avion plus électrique à l'avion tout électrique : état de l'art et prospective sur les réseauxde bord"; J 3eA vol. 4, 2005, Avion e t électricité, de l'électrotechnique haute performance.

* cited by examiner

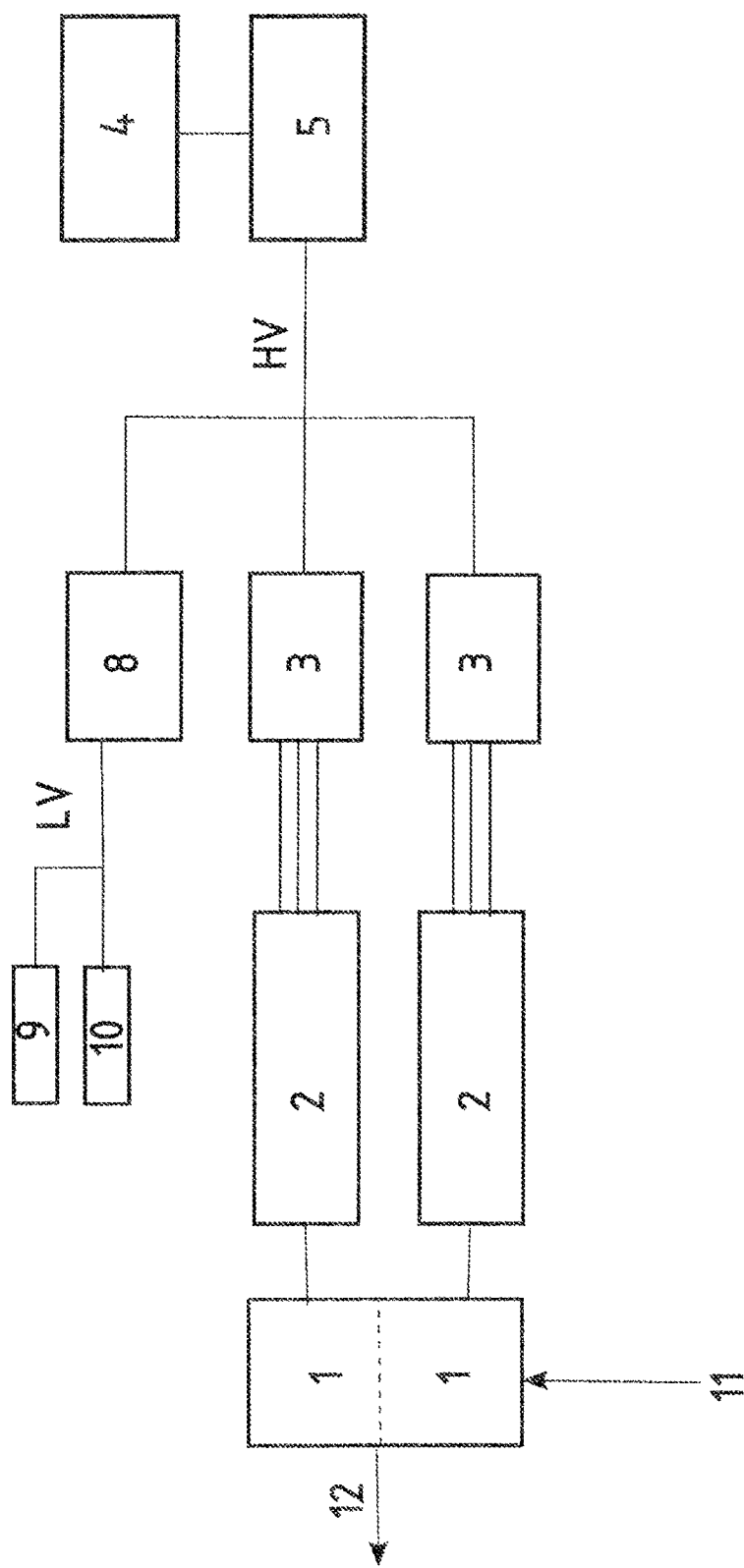

AIR START UNIT FOR STARTING AND SERVICING JET ENGINES IN AIRCRAFT

This nonprovisional application is a continuation of International Application No. PCT/EP2017/074501, which was filed on Sep. 27, 2017, and which claims priority to German Patent Application No. 10 2016 118 743.7, which was filed in Germany on Oct. 4, 2016, and which are both herein incorporated by reference.

BACKGROUND OF THE INVENTION

Field of the Invention

The present invention relates to an air start unit for starting and servicing jet engines of aircraft and other flying machines and at least for temporary air conditioning of flying machines. Such an air start unit is required to supply compressed air for starting the turbines or jet engines.

Description of the Background Art

A jet engine must be accelerated to a certain revolution rate for starting before the self-propulsion of the jet engine can begin. In the normal case, the jet engine must be accelerated to a revolution rate of about 15 to 20% of the maximum revolution rate for this. Such an acceleration usually occurs with the aid of an on-board starter (Auxiliary Power Unit, APU). However, if said starter fails or is unusable or disadvantageous for ecological and/or economic reasons, a so-called external, mobile air start unit (Air Start Unit, ASU) can be used to enable the jet engine to start. Moreover, air start units are used in part to save or reduce servicing costs of on-board starters.

Previous ASUs typically have a fuel-powered gas turbine or a compressor driven by a diesel engine which provide compressed air by removing part of the compressed air flow so that the jet engine can be started. As well as for starting the engine, such an air start unit may also be required for servicing an engine and/or for air conditioning an aircraft.

Because of stricter legislation in the area of emissions, heat and energy consumption, it is necessary to develop such existing air start units correspondingly for lower emissions, to be quieter and with low energy consumption.

It is already known to supply the air start unit with electrical energy for this purpose and to produce the compressed air with the electrical energy. Such an air start unit is known from DE 20 2008 015 623 U1, which is incorporated herein by reference. In this case, compressors are operated with a fuel cell that provides electrical energy to drive the compressors.

However, as battery and accumulator technology has advanced so much in the meantime that compressors can be driven without fuel, it is the object of the present invention to enable an air start unit that is directly powered by electrical energy, which has low emissions, noise protection and low energy consumption.

SUMMARY OF THE INVENTION

It is therefore an object of the present invention to provide and air start unit that is equipped with at least one compressor for producing compressed air and a voltage supply for supplying electrical power consumers, in particular the electrical power consumers of the air start unit. Furthermore, the compressor is driven by at least one electric motor, which is supplied with operating energy from a high voltage battery.

The direct voltage supplied by the high voltage battery can be converted into a single-phase or multi-phase alternating voltage by means of at least one inverter and the electric motors are operated thereby. Thus, d.c. motors or a.c./three-phase motors can be used as electric motors. In this case, the inverter can set the revolution rate of the electric motor by adjusting the frequency of the voltage.

This type of air start unit has the advantage that the electric motors for operating the compressors are powered directly with electrical energy and thus no fuel is required for producing the electrical energy. Owing to the electrical energy, the present air start unit has low emissions and the energy consumption is low, because the electrical energy is used directly for operating the compressors.

Because the technology for storing electrical energy in terms of batteries and accumulators as energy storage is now so far advanced that the energy can be stored well and high efficiency energy storage is provided, the electrical energy can be stored in a high voltage battery.

The high voltage battery is preferably implemented as a lithium-ion battery in order to be able to briefly draw high power for operating the compressor. Starting and servicing the jet engine only lasts a short time, so that the high power is required only briefly. For example, drawing energy of 320 kW for a period of 2 min is necessary. However, this requirement differs depending on the jet engine.

A charging controller can be associated with the air start unit that controls the charging process for the high voltage battery. Electrical energy can be supplied to said charging controller and the supplied electrical energy will then be supplied to the high voltage battery, so that the battery stores the electrical energy. The charging controller is implemented to be able to supply the battery with different types of voltage, i.e. direct voltage and also alternating voltage. The charging controller can also be designed so that it can be supplied with three-phase electricity. The charging controller ensures that the supplied electrical energy is transformed to a suitable voltage for the high voltage battery and the high voltage battery is then supplied with the transformed voltage. Depending on the configuration of the motors and the inverter, a voltage can be used for this that therefore exceeds the low voltage limit, i.e. exceeds 120 V.

The charging controller also ensures limiting of the charging current and monitoring of the charge capacity of the high voltage battery. In this way the charging controller prevents too much current from being delivered to the high voltage battery and said battery from being damaged as a result. The charging controller also ensures that a fully charged battery is not charged further and the charging current is switched off when the high voltage battery is fully charged.

The high voltage battery supplies a high voltage (HV), by means of which the electric motors are driven. According to the invention, at least one electric motor and at least one compressor, which is connected downstream of the electric motor, are provided. However, more electric motors or compressors can also be used.

The use of a three-phase motor as the electric motor is proposed, because this can be procured quite advantageously and has reasonable efficiency. However, a d.c. motor taking electrical energy directly from the battery can also be used as the electric motor.

If three-phase motors are used as electric motors, in a particular exemplary embodiment the use of inverters is provided. The inverters are disposed between the high voltage battery and the electric motors, so that they convert the direct voltage from the high voltage batteries according to the required alternating voltage for the electric motors. Thus for example, an inverter can be provided that produces three-phase electricity with a 400 Volt alternating voltage from a high voltage of 666 Volts direct voltage.

The electric motors in turn drive at least one compressor that produces the required compressed air. At least one compressor is provided for producing the compressed air. However, a plurality of compressors can also be used. If a plurality of compressors is used, these can be operated in parallel order to produce a greater volume of compressed air. They can however also be connected in series in order to ensure a higher pressure of the compressed air. It has proved to be particularly advantageous if the compressors are implemented as radial compressors.

Besides providing compressed air for starting and servicing turbines and jet engines, air start units according to the invention can also be used for the electrical supply of aircraft and other flying machines. However, because the high voltage provided from the high voltage battery is too high for the on-board power supply of an aircraft or another flying machine, for the voltage/electrical energy to be used by the aircraft or other flying machines the voltage/electrical energy must first be controlled to a usable low voltage. For this purpose, in a particular exemplary embodiment a voltage converter is provided that converts the high voltage from the high voltage battery to a low voltage. Said low voltage can be implemented as a direct or alternating voltage. For example, the aforementioned high voltage could be converted from 666 Volts direct voltage to 115 Volts alternating voltage at 400 Hz or even 28 V direct voltage and thereby additionally/in parallel to embody the function of a GPU (ground power unit) with low emissions, quieter and with low energy consumption.

The low voltage (LV) that is provided in this way can be stored in a low voltage battery in a particular embodiment. It is proposed to connect a voltage supply to said battery that ensures the supply of the aircraft and other flying machines with the low voltage. The electrical power consumers of the air start unit are also supplied with low voltage by said voltage supply. Owing to said design, the low voltage battery can either be charged with low voltage by the voltage supply or even by the high voltage battery and the aforementioned voltage converter. The voltage supply can thus either be used as an input or an output of the low voltage supply.

According to the invention, at least one compressor comprises an air inlet and at least one compressor comprises an air outlet. If only one compressor is used it comprises an air inlet and an air outlet. The air inlet ensures that air is fed to the compressor and the compressor converts this into compressed air according to the invention. Said compressed air produced in this way is then output at the air outlet. The compressed air that is output at the air outlet can then be used for starting and servicing jet engines of aircraft and other flying machines.

In an embodiment when using a plurality of compressors, the compressors can produce compressed air in multiple stages, in which the air inlet is only fed to one compressor and the air is then first compressed by the first compressor so that said compressed air is produced with a defined pressure. Said produced compressed air is then fed to the next connected compressor, which again compresses the already compressed air. Thus, higher pressures can be produced. Also, more than two compressors can be connected in series. The air outlet is then only disposed on the last compressor of the successively connected compressors.

The aforementioned components can be mounted on a mounting panel and a suitable housing can be used that encloses the entire device. The housing is preferably provided with sound insulation elements, so that noise from the interior of the housing is only output to the exterior of the housing in an attenuated form. Thus, sound protection is implemented. Moreover, the housing is also used for thermal isolation against high external temperatures, radiated heat and other ambient influences such as rain and dust. Moreover, it is also an object of the housing to shield the operator against components carrying high voltages.

The high voltage batteries can advantageously be accommodated in module frames that can be air conditioned and preferably connected to the mounting panel in a modular manner by means of quick release devices.

The requirements on the operating duration of the system can thus be varied customer-specifically by the number of battery modules fitted.

For frictionless operation of the proposed air start unit, furthermore an air conditioning system is proposed that is associated with the air start unit. Because in particular the inverter and the high voltage battery provide the full power or capacity thereof only in a certain temperature range, the air conditioning system ensures that the high voltage battery and the inverter can operate in said temperature range. Thus, the proposed air conditioning system can cool but also heat the high voltage battery and inverter components. The result is that at very low external temperatures the components can be correspondingly heated in order to ensure optimal operation. Likewise, at very high ambient temperatures the components can be cooled down.

Furthermore, it is proposed to assign an oil module to the air start unit that lubricates the movable parts of the compressors. For this purpose, the oil module ensures that there is a film of oil in the compressors, which ensures that the movable parts of the compressors, for example the radial shafts, run with the minimum possible friction. The oil module comprises an oil reservoir and a pressure system for this in order to be able to deliver oil from the oil reservoir to the compressors. In terms of design, it must be ensured that the compressed air that is produced is delivered free of oil to the connected load. This can be done by sealing the compressed air supply, for example.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein:

FIG. 2 shows a block diagram of an air start unit according to the invention.

DETAILED DESCRIPTION

Figure 1:
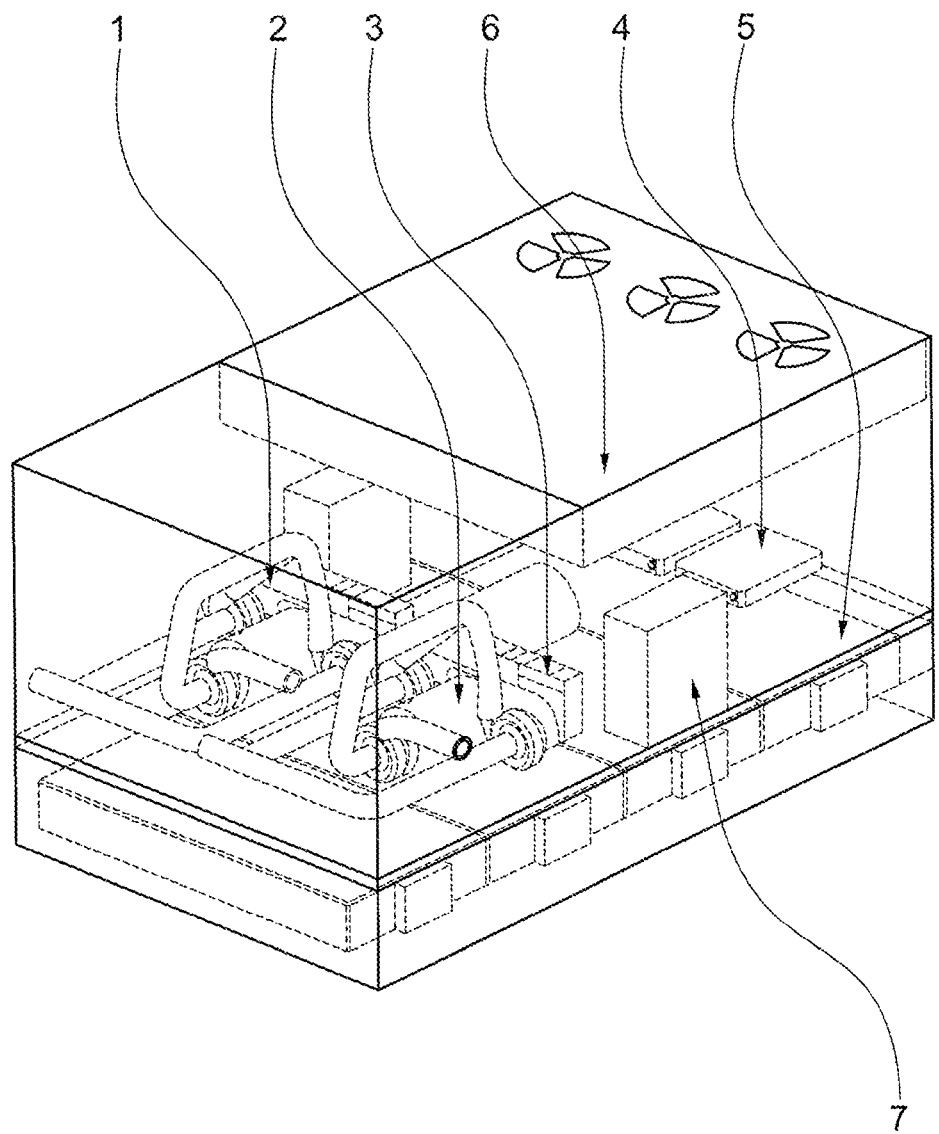
FIG. 1 shows a perspective representation of an air start unit according to the invention.

In FIG. 1, components of an air start unit according to the invention are shown as a perspective representation. For this the components are mounted on a mounting panel.

Two compressors 1 for producing compressed air are mounted on the mounting panel. An electric motor 2 is associated with the compressors 1 in order to drive the compressors 1.

The electric motors 2 shown are implemented here as three-phase motors, for which reason they are supplied with electrical energy by means of inverters 3. The inverters 3 in turn draw the electrical energy thereof from a high voltage battery 5 that is embedded in the mounting panel. The high voltage battery 5 now supplies the inverters 3 with high voltage (HV), for example a direct voltage of 600 Volts. For the description of the present invention, any voltage above the low voltage level is referred to as a high voltage.

The high voltage supplied to the inverters 3 from the high voltage battery 5 is now converted by the inverters 3 into three-phase electricity and supplied to the electric motors 2. The electric motors 2 in turn drive the compressors 1. A belt drive has proved advantageous here, so that the compressors 1 are each driven by the motors 2 by means of a respective belt drive.

In order to be able to charge the high voltage battery 5, a charging controller 4 is shown that comprises electrical connectors in order to supply said connectors with electrical energy from outside the air start unit for charging the high voltage battery 5.

So that the compressors 1 operate frictionlessly, an oil module 7 is provided that supplies the movable parts of the compressors 1 with oil. Also shown is an air conditioning system 6 that controls the air start unit within certain temperature limits. The air conditioning system 6 thus ensures that the air within the air start unit and also the components do not fall below or exceed certain temperature ranges. For this purpose, the air conditioning system 6 is designed to be able to cool and/or heat the air in the air start unit.

FIG. 2 illustrates once again the working principle of the proposed air start unit as a block diagram. The air start unit comprises a high voltage battery 5 that supplies high voltage (HV). The high voltage battery 5 can be charged by a charging controller 4. In this exemplary embodiment, the high voltage that is output is supplied to two inverters 3, which can convert three-phase voltages for two electric motors 2 from the high voltage battery 5. The use of inverters 3 has the further advantage that the starting and stopping process of the electric motors 2 can be optimally controlled by suitable starting up and stopping ramps. For this purpose, the inverter 3 controls the frequencies according to a mathematical function when starting up and stopping the electric motors 2.

Two compressors 1 connected in series are driven by means of the electric motors 2 that are driven in this way, advantageously by means of a belt drive. In this exemplary embodiment the compressors 1 are connected in series in order to enable higher pressures of the compressed air. Normal air is thus supplied via an air inlet 11 to the first compressor 1, which produces compressed air in two stages from the supplied air. The second compressor stage is associated with an air outlet 12, so that the compressed air can be taken from the compressor 1. Jet engines or turbines of aircraft and other flying machines are then driven with said extracted compressed air for starting and servicing.

With universally applicable air start units, it has proved advantageous to first operate two compressors in parallel and to connect a further third compressor downstream (not shown). With this operating principle, the system is fitted with two air outlets 12 in order to be able to transfer the required air flow, for example for starting the one engine with acceptable flow losses. Moreover, for this reason most aircraft are equipped with a plurality of air inlet ports so that the air can be supplied via a plurality of hoses.

Likewise, FIG. 2 shows a voltage converter 8 that converts between the high voltage HV and a low voltage LV. In this exemplary embodiment, the low voltage is implemented as a direct voltage. Furthermore, a low voltage battery 9 that can store the low voltage is provided at the low voltage. A voltage supply 10 is provided for supplying and drawing the low voltage. This enables either the low voltage battery 9 to be charged or low voltage to be taken from the air start unit for operating electrical power consumers in aircraft or other flying machines. The voltage taken is then supplied from the low voltage battery 9 and/or the high voltage battery 5 with the voltage converter 8 connected between. The electrical power consumers of the air start unit are also supplied with the low voltage.

The present invention is not limited to the aforementioned features. Rather, further embodiments are conceivable. Thus, instead of three-phase motors, d.c. motors could also be used as electric motors. In this case, the use of the inverter is dispensed with. It is also possible to use a plurality of high voltage batteries in order to increase either the capacity of the high voltage battery or the voltage that is drawn from the high voltage battery. Furthermore, it is possible to drive the compressors not by means of a belt drive between the electric motor and the compressors, but for example by means of direct drive, with which the compressor is connected to the shaft of the electric motor. In this case, it is also possible to control the revolution rate by means of a gearbox. The high voltage battery and also the compressors are of a modular design, so that depending on the power requirement suitable compressors and high voltage batteries can be used in the air start unit and may be replaced.

The invention being thus described, it will be obvious that the same may be varied in many ways. Such variations are not to be regarded as a departure from the spirit and scope of the invention, and all such modifications as would be obvious to one skilled in the art are to be included within the scope of the following claims

What is claimed is:

1. An air start unit for starting and servicing jet engines of aircraft and other flying machines, the air start unit comprising: at least one compressor configured to produce compressed air; a voltage supply to supply electrical power; wherein the at least one compressor is driven by at least one electric motor; wherein electrical energy for operating the at least one electric motor is supplied from at least one high voltage battery, wherein a voltage converter is provided in the air start unit that converts a high voltage of the at least one high voltage battery to a low voltage, wherein the low voltage is a direct voltage or an alternating voltage, and wherein a low voltage battery is provided in the air start unit and is connected downstream of the voltage converter and upstream of the voltage supply, and wherein the voltage supply is directly connected to the low voltage battery and directly connected to the voltage converter.

2. The air start unit as claimed in claim 1, wherein the electrical energy supplied from the at least one high voltage battery is converted into three-phase electricity for the at least one electric motor by at least one inverter.

3. The air start unit as claimed in claim 2, wherein an air conditioning system is provided in the air start unit that heats and cools the at least one inverter, the at least one high voltage battery, the at least one compressor and the at least one electric motor.

4. The air start unit as claimed in claim 2, wherein the at least one compressor, the at least one electric motor, the at least one inverter, a charging controller, the at least one high voltage battery, an air conditioning system, an oil module, a voltage converter, a low voltage battery and the voltage supply are mounted in the air start unit in modular form and thereby replaceable and configurable to be customer specific.

5. The air start unit as claimed in claim 1, wherein the voltage supply draws electrical energy from the low voltage battery and/or the voltage converter.

6. The air start unit as claimed in claim 1, wherein a charging controller is provided in the air start unit that controls a charging process for the at least one high voltage battery.

7. The air start unit as claimed in claim 1, wherein the at least one compressor comprises an air inlet and at least one air outlet.

8. The air start unit as claimed in claim 1, further comprising an oil module that provides oil supply for elements of the air start unit that require lubrication, the elements including the at least one compressor and the at least one electric motor.

9. The air start unit as claimed in claim 1, wherein the at least one compressor is driven by the at least one electric motor by a belt drive.

10. The air start unit as claimed in claim 1, wherein the at least one compressor is a radial compressor.

11. The air start unit as claimed in claim 1, wherein the at least one compressor includes at least two compressors that are used to produce the compressed air in multiple stages.

12. The air start unit as claimed in claim 1, wherein a housing is disposed around the air start unit, the housing being equipped with sound insulation and/or thermal insulation.

13. The air start unit as claimed in claim 1, wherein a mounting panel is provided on which the air start unit is constructed.

\* \* \* \* \*